(12) United States Patent
Fisk

(10) Patent No.: US 9,701,168 B2
(45) Date of Patent: Jul. 11, 2017

(54) VARIABLE RIGIDITY TOW CABLE

(71) Applicant: LOCKHEED MARTIN CORPORATION, Bethesda, MD (US)

(72) Inventor: Bryan Neal Fisk, Madison, AL (US)

(73) Assignee: Lockheed Martin Corporation, Bethesda, MD (US)

( * ) Notice: Subject to any disclaimer, the term of this patent is extended or adjusted under 35 U.S.C. 154(b) by 69 days.

(21) Appl. No.: 14/503,747

(22) Filed: Oct. 1, 2014

(65) Prior Publication Data

US 2015/0090172 A1  Apr. 2, 2015

Related U.S. Application Data

(60) Provisional application No. 61/885,142, filed on Oct. 1, 2013.

(51) Int. Cl.
| | |
|---|---|
| *B63B 21/66* | (2006.01) |
| *B60D 1/18* | (2006.01) |
| *B60D 1/167* | (2006.01) |

(52) U.S. Cl.
CPC ............. *B60D 1/18* (2013.01); *B60D 1/167* (2013.01); *B63B 21/66* (2013.01); *B63B 2021/666* (2013.01); *Y10T 428/2933* (2015.01)

(58) Field of Classification Search
CPC .................................................... B63B 21/66
See application file for complete search history.

(56) References Cited

U.S. PATENT DOCUMENTS 1,601,983 A * 10/1926 Savage .................. A63H 13/02
446/339

5,902,254 A * 5/1999 Magram ................ A61M 25/09
600/585
2004/0066707 A1   4/2004 Tenghamn et al.
2007/0213687 A1 * 9/2007 Barlow ............ A61M 25/0662
604/523
2012/0006246 A1   1/2012 Teter
2013/0058192 A1   3/2013 Gateman et al.

FOREIGN PATENT DOCUMENTS

| EP | 1208035 | 4/2005 |
|---|---|---|
| EP | 2330027 | 6/2011 |
| GB | 2509400 | 7/2014 |

OTHER PUBLICATIONS

International Search Report and Written Opinion for international application No. PCT/US2014/058605, dated Dec. 8, 2014 (10 pages).

* cited by examiner

*Primary Examiner* — Edwin Swinehart
(74) *Attorney, Agent, or Firm* — Hamre, Schumann, Mueller & Larson, P.C.

(57) ABSTRACT

A variable rigidity tow cable for attaching a first vehicle with a second vehicle. The tow cable includes a tension control cable having a first end and a second end. Tension on at least one of the ends of the tension control cable can be controlled to increase or decrease the length of the tension control cable. A plurality of beads are slidingly disposed on the tension control cable between the first end and the second end. The beads are free to move relative to one another on the tension control cable when the tension control cable is slack, and the beads are engaged with each other to form a rigid structure around the tension control cable when tension is applied to the tension control cable.

19 Claims, 5 Drawing Sheets

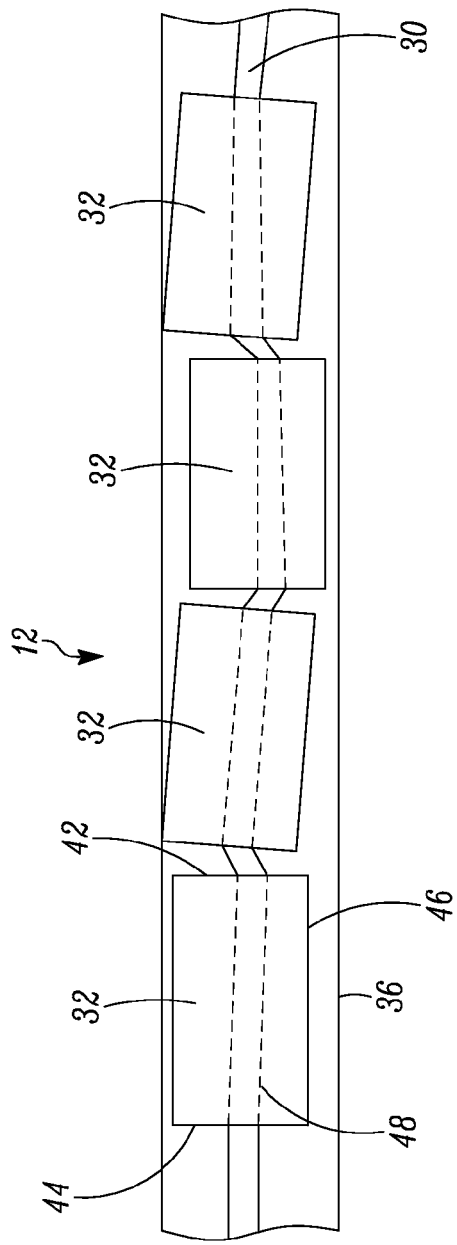
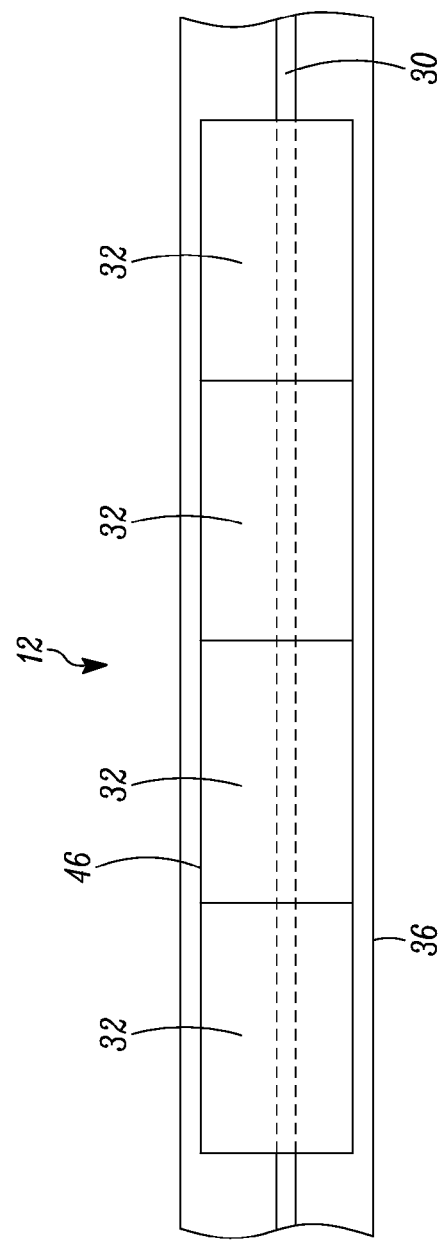

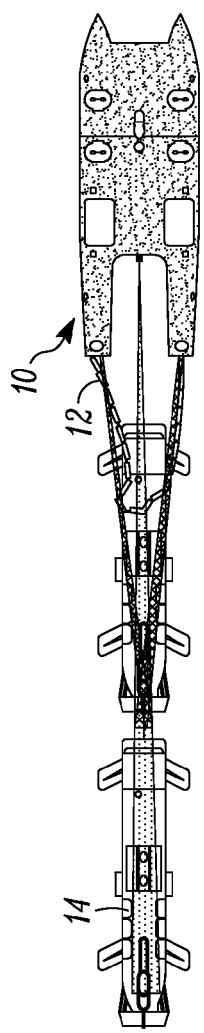
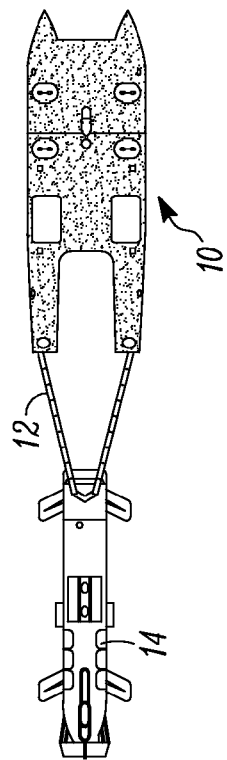
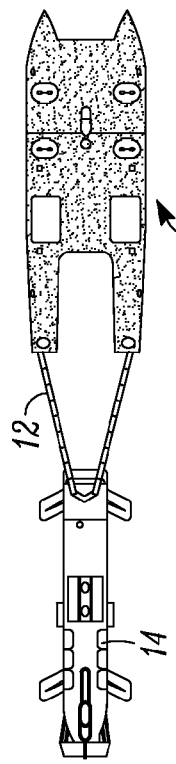
FIG. 8A
FIG. 8B
FIG. 8C

VARIABLE RIGIDITY TOW CABLE

FIELD

This technical disclosure relates to systems and methods for attaching a first or docking vehicle with a second or receiving vehicle, for example during a docking procedure.

BACKGROUND

When docking two vehicles at sea, there are six degrees of freedom of motion: roll, pitch, yaw, heave, surge and sway. Motion restriction between the two vehicles can be achieved using a rigid towing structure, such as a steel A-frame. However, a rigid towing structure does not have a satisfactory safety level since it lacks flexibility during attachment.

Current tow cable designs used at sea permit too much motion to make timely hard connections possible or easily automated. For example, FIG. 1 illustrates a first or docking vehicle 2 which in the illustrated example can be a Remote Multi-Mission Vehicle (RMMV) such as an Autonomous Unmanned Vehicle (AUV), an Unmanned Surface Vehicle (USV), an Unmanned Underwater Vehicle (UUV), a manned vehicle such as manned submersible, or the like. The docking vehicle 2 is shown being towed by a second or receiving vehicle 4 (only partially illustrated) using one or more conventional cables 6 such as ropes, chains or the like.

Due to the flexibility of the cable 6, unless the docking vehicle 2 is actively towed, the cable 6 permits fore and aft motions A of the docking vehicle 2 relative to the receiving vehicle 4. In addition, the cable 6 permits the docking vehicle to swing along the axis B relative to the vehicle 4. Therefore, with a conventional cable 6, collisions are a serious risk with at-sea docking and can result in damage to vehicles, loss of material, or even loss of life. Similar relative motions and resultant dangers are present when attaching any two vehicles including land vehicles, space vehicles, sea vehicles and the like.

SUMMARY

A system and method are described for attaching a first or docking vehicle with a second or receiving vehicle. The two vehicles are attached using a variable rigidity tow cable that is configured to be variably and selectively flexible or slack, or made rigid.

The variable rigidity tow cable, when made rigid, removes independent surge and sway between the first vehicle and the second vehicle to prevent collisions between the first vehicle and the second vehicle. When the tow cable is flexible or slack it is not dangerous to any vehicle impacting it.

The term "docking" as used herein includes maneuvering the first vehicle relative to the second vehicle to properly position the first vehicle and once positioned, securing the first vehicle to the second vehicle. The docking can be temporary in that the first vehicle is intended to be released from the second vehicle after some period of time, or the docking can be considered non-temporary, for example for the purposes of retrieving the first vehicle by the second vehicle. The first vehicle can be disposed in the water, disposed on land or in space prior to and/or after docking. The second vehicle also can be disposed in the water, disposed on land or disposed in space prior to and/or after docking.

The variable rigidity tow cable can be used in any application where a first vehicle needs to be docked with or otherwise attached to a second vehicle. For example, the first vehicle can be a manned or unmanned underwater vehicle, a manned or unmanned surface water vehicle, a manned or unmanned land vehicle, or a manned or unmanned space vehicle. The second vehicle can be a floating refueling sled to which the first vehicle needs to dock to fuel the first vehicle, a water-borne vessel that is designed to retrieve the first vehicle while the vessel remains in the water, a trailer on which the first vehicle docks to remove the first vehicle from water, a land vehicle that is being used to tow the first vehicle, a space vehicle, or the like. In one embodiment, the variable rigidity tow cable described herein can be used to attach two at-sea vessels, for example commercial, military and private vessels.

In one embodiment, a variable rigidity tow cable includes a tension control cable, a tension control device connected to the tension control cable that controls tension in the tension control cable to increase and decrease a length of the tension control cable, and beads that are selectively movably disposed on the tension control cable. The beads are free to move relative to one another on the tension control cable when the tension control cable has a first length as determined by the tension control device, and the beads are engaged with each other to form a rigid structure around the tension control cable when tension is applied to the tension control cable by the tension control device so that the tension control cable has a second length less than the first length.

In another embodiment, a tow vehicle includes a vehicle body, and a tension control cable having a first end and a second end, where each of the first end and the second end are attached to the vehicle body. A first tension control device is mounted on the vehicle body and is operatively connected to the first end or to the second end of the tension control cable so as to control tension in the tension control cable to increase and decrease a length of the tension control cable. Beads are selectively movably disposed on the tension control cable. The beads are free to move relative to one another on the tension control cable when the tension control cable has a first length as determined by the first tension control device, and the beads are engaged with each other to form a rigid structure around the tension control cable when tension is applied to the tension control cable by the first tension control device so that the tension control cable has a second length less than the first length.

The term cable as used herein is intended to encompass a cable formed of strands of metal wire or other material, rope, chain, and other structures that can be used in place of cable, rope, and chain.

DRAWINGS

FIG. 4 is a cross-sectional view of a portion of the variable rigidity tow cable with the tow cable in the flexible or slack state.

FIG. 5 is a cross-sectional view of a portion of the variable rigidity tow cable with the tow cable in the rigid state.

FIGS. 8A, 8B and 8C illustrate different stages of a first vehicle docking with the second vehicle and operation of the variable rigidity tow cable.

DETAILED DESCRIPTION

A system and method are described for attaching a first or docking vehicle with a second or receiving vehicle using a variable rigidity tow cable. The variable rigidity tow cable is configured to be variably and selectively flexible or slack, and made rigid.

Figure 1:
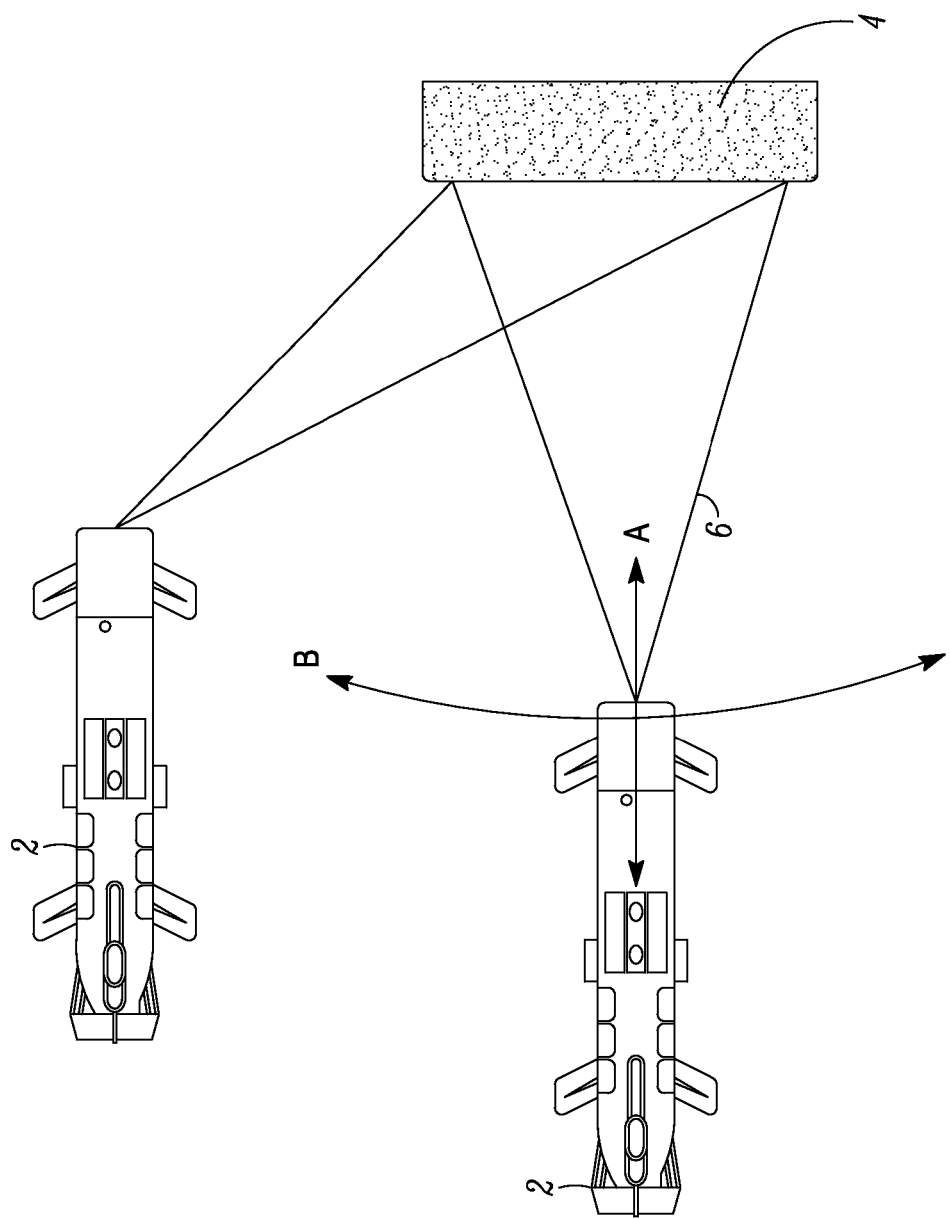
FIG. 1 illustrates operation of a standard cable that connects two vehicles at sea.

The variable rigidity tow cable, when made rigid, removes independent surge (i.e. fore/aft movements) and sway (swinging along the axis B in FIG. 1) between the first vehicle and the second vehicle to prevent collisions between the first vehicle and the second vehicle and other vehicles. The variable rigidity tow cable also permits both vehicles to move independently in a heave direction (a z-axis or into and out of the page when viewing FIGS. 2 and 3). When the tow cable is flexible or slack it is not dangerous to any vehicle impacting it.

The concepts described herein can be applied to any two vehicles operating in any environment, e.g. under the water, in the water, on land, in the air, in space, etc., where it is desired to dock or attach one vehicle with a second vehicle for any reason and prevent surge and sway of the first vehicle relative to the second vehicle.

To facilitate explanation of the various embodiments described herein, the two vehicles will be described herein as being water-based vehicles. In particular, the first or docking vehicle will be described as being a Remote Multi-Mission Vehicle (RMMV) such as an Autonomous Unmanned Vehicle (AUV), an Unmanned Surface Vehicle (USV), an Unmanned Underwater Vehicle (UUV), a manned vehicle such as manned submersible, or the like. The second or receiving vehicle will be described as being a refueling craft that is designed to refuel the first vehicle once the first vehicle is docked with the second vehicle. In this example, the first vehicle is considered docked with the second vehicle when the two vehicles are secured together by the variable rigidity tow cable in a manner that permits fuel transfer to occur between the two vehicles. However, the embodiments described herein are not limited to water-based vehicles, and not limited to refueling of the first vehicle by the second vehicle.

Figure 2:
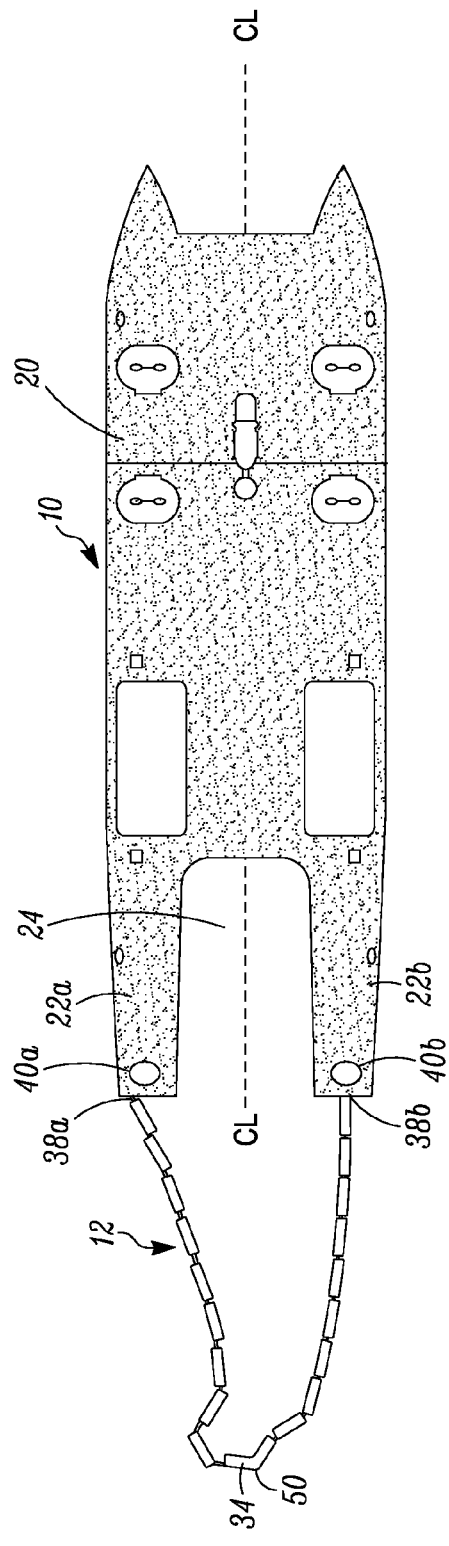
FIG. 2 is a top view of a vehicle that trails a variable rigidity tow cable described herein with the tow cable in a flexible or slack state.
Figure 3:
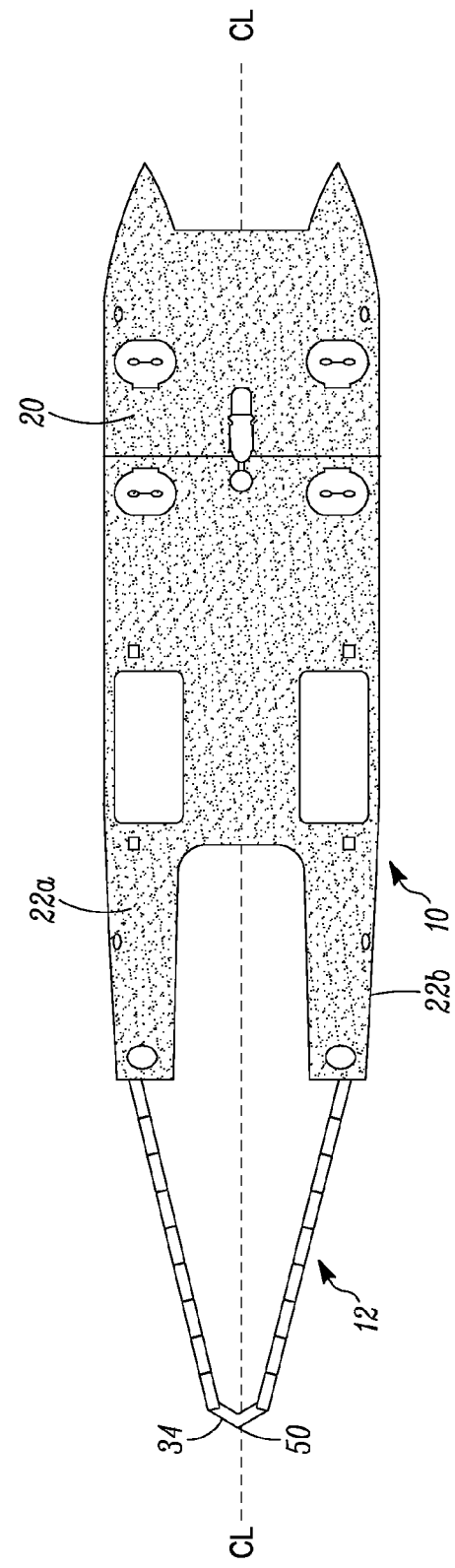
FIG. 3 is a top view of the vehicle of FIG. 2 with the variable rigidity tow cable in a rigid state.

With reference to FIGS. 2-3, a receiving vehicle 10 is illustrated to which a variable rigidity tow cable 12 described herein is attached. In the illustrated example, the tow cable 12 is attached to the rear of the receiving vehicle 10 so the tow cable 12 trails behind the vehicle 10. However, in other embodiments, the tow cable 12 can be attached to the front of the vehicle 10 so that it is disposed in front of the vehicle 10, or attached to one of the sides of the vehicle 10 so that it is disposed to one side of the vehicle 10.

The vehicle 10 is configured to operate in, on and/or under water, and in one embodiment can be a USV that is configured to dock with and refuel a docking vehicle 14 (illustrated in FIGS. 8A-C) which in one embodiment can be an RMMV that can also operate in, on and/or under water. In the refueling example described herein, the vehicle 10 can have any configuration that is suitable for performing its refueling function.

In the example illustrated in FIGS. 2 and 3, the vehicle 10 includes a longitudinal centerline CL, a vehicle body 20, a first float member 22a that extends rearwardly from the body 20, and a second float member 22b that extends rearwardly from the body 20. The float members 22a, 22b are spaced from one another, substantially equally spaced on either side of the centerline CL, and define a space 24 therebetween at the rear of the vehicle 10. The float members 22a, 22b are also generally parallel to one another and generally parallel to the centerline CL.

The vehicle 10 used can have any other shapes and configurations as well and does not require the pair of float members 22a, 22b or the space 24 between the float members. Any shape or configuration of the vehicle 10 to which the tow cable 12 can be attached and operate as intended can be utilized. In one non-limiting example, the vehicle 10 can be configured as a refueling sled as described in copending application Ser. No. 14/503,744 titled Fresnel Lens Optical Alignment System filed on Oct. 1, 2014, the entire contents of which are incorporated herein by reference.

The variable rigidity tow cable 12 is constructed in a manner that permits the tow cable 12 to be selectively and controllably made slack and rigid. In one embodiment described further below, the tow cable 12 is initially in a slack condition during docking and is then made rigid, for example using an active tension control device, to complete attachment of the first vehicle to the second vehicle. In another embodiment described further below, the tow cable 12 is initially in a rigid condition during docking and is made slack, for example using a passive tension control device, when the docking vehicle contacts the tow cable.

With reference to FIGS. 2-3 and FIGS. 4-5, the tow cable 12 is illustrated as including a tension control cable 30, a plurality of beads 32 disposed on the tension control cable 30, an apex bead 34, and a sheath 36 that surrounds the beads 32, 34.

The tension control cable 30 can be any elongated structure formed of a high tensile strength material such as a metal or Amsteel Blue cable, chain, rope or other high tensile strength structure. The beads 32 are placed over the tension control cable 30. In one embodiment, the beads 32 are high compression-strength, hollow cylinder-like constructions. The rigidity of the tow cable 12 is controlled by controlling the tension in the tension control cable 30. When the tension control cable 30 is in a relaxed or slack state, the beads 32 are free to move on the tension control cable 30, making the whole construction flexible. However, when tension is applied to the tension control cable 30, the beads 32 are brought into engagement with each other forming a rigid tow cable 12 structure.

The outside, visible portion of the tow cable 12 is smooth due to the outer sheath 36 so that a catch hook of the vehicle 14 to be towed is free to move along the tow cable 12 before positive tension is applied.

The tow cable 12 is attached at two points on the towing vehicle 10, port and starboard. The tow cable 12 can trail behind the towing vehicle, forming a 'U' or 'V' shape in the water. At the apex of the tow cable 12 there is the apex bead 34. In one embodiment, the apex bead 34 is attached to the two halves of the tow cable 12, and is rigid and 'V' shaped.

When the towing vehicle 10 partly reels in the tension control cable 30, the beads 32 will bunch up along the length of the tension control cable 30 and come into contact with each other by shortening the tension control cable 30. Applying an increasing tension to the tension control cable 30 will cause the beads 32 and the V-shaped apex bead 34 to form a rigid structure around the tension control cable 30, forming the rigid tow cable 12. If the tension control cable 30 is reeled out (i.e. tension reduced), the tow cable 12 becomes flexible again.

Figure 6:
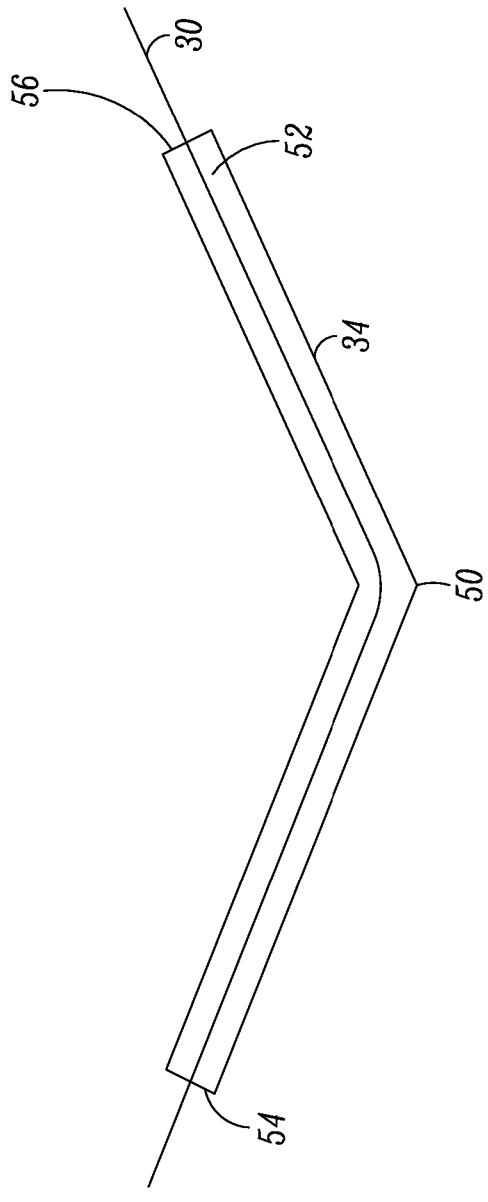
FIG. 6 illustrates one embodiment of the apex bead of the variable rigidity tow cable.

In one embodiment illustrated in FIGS. 2-3 and 6, the tension control cable 30 can be a single-piece, continuous structure that can extend through the beads 32, 34 from one end 38a that is attached to the first float member 22a to a second end 38b that is attached to the second float member 22b.

At least one of the ends 38a, 38b is mounted to a tension control device 40a, 40b that selectively controls the tension in the tension control cable 30 to increase and decrease the length of the tension control cable 30 between the first end 38a and the second end 38b to control the rigidity of the tow cable 12. The tension control device(s) 40a, 40b controls the length of the tension control cable 30 so that the tension control cable 30 is actuatable between a first length at which the tow cable 12 is flexible or slack (as shown in FIGS. 2 and 4) and a second length that is less than the first length at which the tow cable 12 is rigid (as shown in FIGS. 3 and 5).

In one embodiment, the first end 38a is connected to the tension control device 40a that is disposed on the vehicle 10, for example in the first float member 22a. In another embodiment, the second end 38b is also connected to the tension control device 40b that is disposed on the vehicle 10, for example in the second float member 22b. The tension control devices 40a, 40b can be any mechanisms that can control the tension in the tension control cable 30 and thereby control the rigidity of the tow cable 12.

In one embodiment, each of the tension control devices 40a, 40b are active tension control devices that actively control the tension. One example of active tension control devices 40a, 40b includes, but is not limited to, reels. One reel can wind up the tension control cable 30 thereon via the first end 38a to decrease the length of the tension control cable 30, as well as pay out the tension control cable 30 to increase the length of the tension control cable. Similarly, the other reel can wind up the tension control cable 30 thereon via the second end 38b to decrease the length of the tension control cable 30, as well as pay out the tension control cable 30 to increase the length of the tension control cable 30. The tension control devices 40a, 40b can work individually or in unison to control the length of the tension control cable 30.

When active tension control devices are used as the tension control devices 40a, 40b, the tow cable 12 is initially in a slack or non-rigid condition as shown in FIG. 2. When a docking vehicle is in correct position and engaged with the tow cable 12 for docking, one or both of the active tension control devices 40a, 40b increases the tension on the tension control cable 30 which decreases the length of the tension control cable 30. When the tension control cable 30 is shortened at either end by the tension control device(s) 40a, 40b, the bead(s) nearest the vehicle 10 engages with the vehicle 10 to cause all of the beads 32, 34 to bunch up and engage with one another along the length of the tension control cable 30 to create the rigid tow cable 12 as shown in FIG. 3.

In another embodiment, each of the tension control devices 40a, 40b are passive tension control devices that passively control the tension in the tension control cable 30 and thus passively control the rigidity of the tow cable 12. Examples of passive tension control devices include, but are not limited to, air spring devices, hydraulic devices, or other automatically variable tensioning devices that are connected to the two ends 38a, 38b. In the case of air spring devices, the air spring device can be similar in construction and operation to an air spring used on semi-trailers, trucks and other vehicles. When passive tension control devices are used as the tension control devices, the tow cable 12 is initially in a rigid condition as a result of a constant tension applied to the tension control cable 30 by the passive tension control devices. When an object such as a docking vehicle contacts the tow cable 12 with sufficient force, the force is transmitted to one or both of the passive tension control devices which automatically reduce the tension on the tension control cable 30, which as a result reduces the rigidity of the tow cable 12 to avoid damaging the vehicle making contact with the tow cable 12. In effect, the passive tension control device(s) self-adjusts the tension of the tow cable 12.

Figure 7:
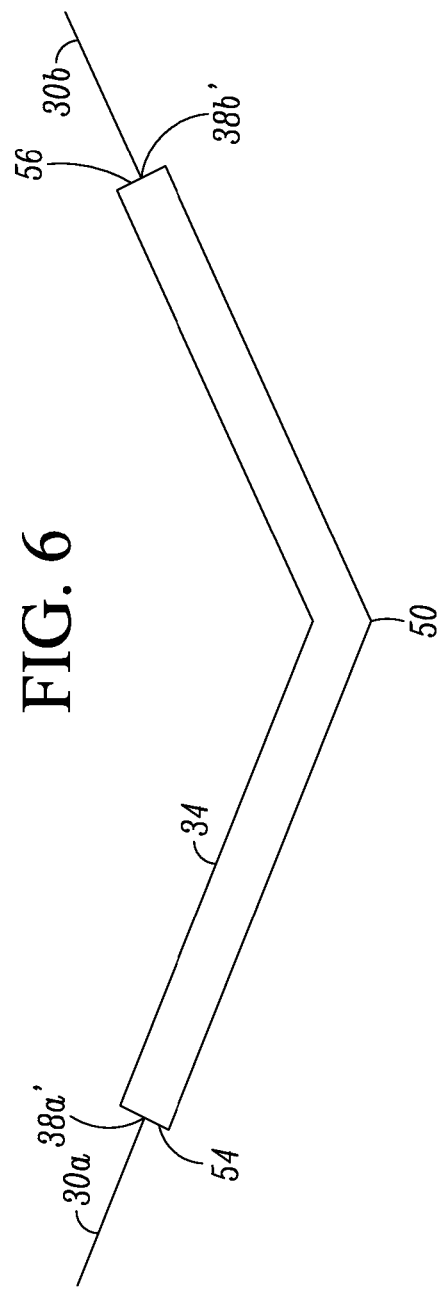
FIG. 7 illustrates another embodiment of the apex bead of the variable rigidity tow cable.

In another embodiment illustrated in FIG. 7, the tension control cable 30 is formed by two tension control cable segments 30a, 30b, with one tension control cable segment 30a having the end 38a attached to the tension control device 40a in the first float member 22a and the other end 38a' attached to the apex bead 34, and the other tension control cable segment 30b having the end 38b attached to the tension control device 40b in the second float member 22b and the other end 38b' attached to the apex bead 34. In this embodiment, the tension control devices 40a, 40b can be active or passive tension control devices as discussed above, and can be used together to control the rigidity of the tow cable 12 in the manner discussed above for the active and passive tension control devices 40a, 40b by controlling the tension in both of the tension control cable segments 30a, 30b of the tension control cable 30.

Returning to FIGS. 2 and 3, the beads 32, 34 are disposed along the majority of the length of the tension control cable 30. The beads 32, and in the embodiment of FIG. 6 the apex bead 34, are free to move relative to one another on the tension control cable 30 when the tension control cable 30 is slack, and the beads 32, 34 are engaged with each other to form a rigid structure around the tension control cable 30 when tension is applied to the tension control cable 30 to shorten the length of the tension control cable 30.

In the embodiment of FIG. 7, the apex bead 34 is not movable on the tension control cable 30 since the segments 30a, 30b are fixed to the apex bead 34. However, the first plurality of beads 32 on the segment 30a and the second plurality of beads 32 on the segment 30b are free to move relative to one another on their respective segments 30a, 30b when the cable segments 30a, 30b are slack, and the beads 32 are engaged with each other and engaged with a respective end of the apex bead 34 and with the back end of the vehicle 10 as shown in FIG. 3 to form a rigid structure around the segments 30a, 30b when tension is applied to the segments 30a, 30b to shorten the lengths of the tension control cable segments 30a, 30b.

When the tow cable 12 is used in a water environment, the buoyancy of the beads 32 and the apex bead 34 can be selected based upon the particular application of the tow cable 12. In one embodiment, the tow cable 12 can be designed for use at the surface of the water, in which case the beads 32 and the apex bead 34 can be configured to be substantially positively buoyant. In another embodiment, the tow cable 12 can be designed for use at some distance below the surface of the water, in which case the beads 32 and the apex bead 34 can be configured to be substantially neutrally buoyant. In another embodiment, the tow cable 12 can be designed for underwater use in a manner so that the tow cable 12 hangs below the vessel to which it is attached, in which case the beads 32 and the apex bead 34 can be configured to be substantially negatively buoyant.

When buoyancy is desired, it is not necessary for all of the beads 32 and the apex bead 34 to have the desired buoyancy characteristics. Instead, some proportion of the beads 32 and or the apex bead 34 can be configured to provide the desired buoyancy characteristics, while the remaining beads 32 and/or the apex bead 34 can have different buoyancy characteristics as long as the entire tow cable 12 has the overall desired buoyancy characteristics.

The beads 32 and the apex bead 34 desirably have a high compression strength to be able to withstand contact with one another when the tow cable 12 is made rigid. In one embodiment, the beads 32 are high compression-strength, hollow cylinder-like or barrel-like constructions made of, for example, metal, rubber, plastic or other suitable material. With reference to FIGS. 4 and 5, each of the beads 32 has opposite ends 42, 44 and a curved perimeter surface 46 extending between the opposite ends 42, 44 so that each bead 32 is of generally cylindrical construction and is generally circular in shape when viewed from either end 42, 44. Each bead 32 further includes a cable passageway 48 extending therethrough from one end 42 thereof to the other end 44 thereof to allow the tension control cable 30 or the tension control cable segments 30a, 30b to extend through each bead 32 as illustrated in dashed lines in FIGS. 4 and 5.

With reference to FIGS. 2-3 and 6-7, the apex bead 34 also has high compression strength. The apex bead 34 is disposed midway along the beads 32 and has a V-shape that defines an apex 50. As shown in FIG. 3, when the tow cable 12 is rigid (i.e. when tension is applied to the tension control cable 30 to decrease its length), the centerline CL, which is an imaginary axis, bisects the variable rigidity tow cable 12 and the centerline CL also extends through the apex 50. In the embodiment of FIG. 6, the apex bead 34 can include a cable passageway 52 that allows passage of the tension control cable 30 therethrough from one end 54 to an opposite end 56. In the embodiment of FIG. 7, the ends 38a', 38b' of the tension control cable segments 30a, 30b are suitably fixedly attached to the apex bead 34, for example to the ends 54, 56 of the apex bead 34.

Returning to FIGS. 4 and 5, the sheath 36 surrounds the beads 32 and the apex bead 34 and can extend partially or substantially the entire length of the tow cable 12 between the first end 38a and the second end 38b of the tension control cable 30. The sheath 36 allows a hook or other capture structure on the vehicle 14 to slide along the tow cable 12 without catching on the beads 32 until the capture hook reaches the apex bead 34. The sheath 36 can be a single continuous structure along the length of the tow cable 12 that it covers or the sheath 36 can be formed of a plurality of separate sections. The sheath 36 is desirably flexible to permit the sheath 36 to flex with the tow cable 12 when the tow cable 12 is slack, and can be formed of a low friction material such as natural or synthetic rubber, a synthetic polymer such as polyvinyl chloride, a metal mesh fabric, and the like.

By controlling the tension in the tension control cable 30 or the cable segments 30a, 30b, for example shortening the length of the tension control cable 30, the beads 32, 34 bunch up on the tension control cable 30 by the beads 32 being squeezed between the back end of the vehicle 10 and the ends of the apex bead 34, and the beads 32, 34 are engaged with each other as shown in FIGS. 3 and 5 to form a rigid structure around the tension control cable 30 so that the tow cable 12 is essentially rigid. When the vehicle 14 is attached by the tow cable 12 to the vehicle 10 and the tow cable 12 is made rigid, the tow cable 12 prevents independent surge (i.e. fore/aft movements) and sway (swinging along the axis B in FIG. 1) between the vehicles 10, 14, while permitting both vehicles 10, 14 to move independently of one another in a heave direction (z-axis). In contrast, by controlling the tension in the tension control cable 30 or the cable segments 30a, 30b, for example increasing the length of the tension control cable 30, the beads 32, 34 separate from one another thereby rendering the tow cable 12 slack or flexible.

Example Application

FIGS. 8A-C illustrate an example operation of the variable rigidity tow cable 12. The tow cable 12 is attached to and trails the vehicle 10 in the manner discussed above. As shown in FIG. 8A, the RMMV 14 approaches and aligns with the vehicle 10 to prepare for docking. In one embodiment, the approach and alignment of the RMMV 14 with the vehicle 10 can be aided using an optical alignment system as described in copending application Ser. No. 14/503,744 titled Fresnel Lens Optical Alignment System filed on Oct. 1, 2014, the entire contents of which are incorporated herein by reference.

Once in proper position, a catch hook on the RMMV 14 can engage with the slack tow cable 12. Once the catch hook is engaged, the tow cable 12 is made rigid as shown in FIG. 8B by shortening the tension control cable 30. Once the tow cable 12 is made rigid, the surge and sway movements between the vehicle 14 and the vehicle 10 are removed and fueling can safely begin.

In FIG. 8C, in the case of a refueling operation, once the two vehicles are secured, a suitable refueling attachment can be extended from the vehicle 10 to refuel the RMMV 14.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A variable rigidity tow cable configured for operation with a tow vehicle, comprising:
   a tension control cable having a first end configured to connect to the tow vehicle at a first attachment point on the tow vehicle and a second end configured to connect to the tow vehicle at a second attachment point on the tow vehicle that is spaced from the first attachment point;
   a tension control device connected to the first end or the second end of the tension control cable that controls tension in the tension control cable to increase and decrease a length of the tension control cable;
   beads disposed on the tension control cable, the beads including an apex bead with first and second ends, a first plurality of the beads are slidably disposed on the tension control cable between the first end of the apex bead and the first end of the tension control cable, and a second plurality of the beads are slidably disposed on the tension control cable between the second end of the apex bead and the second end of the tension control cable; and
   the apex bead, the first plurality of beads and the second plurality of beads defining a rigid shape of the tension control cable upon a predetermined decrease in length of the tension control cable to a tensioned length; and the beads in the first plurality of beads and the beads in the second plurality of beads are free to move relative to one another on the tension control cable when the tension control cable has a length greater than the tensioned length.

2. The variable rigidity tow cable of claim 1, wherein the apex bead includes an apex, and an imaginary axis that bisects the variable rigidity tow cable when the tension control cable is at the tensioned length extends through the apex.

3. The variable rigidity tow cable of claim 1, wherein each bead of the first and second plurality of beads has a cylindrical shape with opposite ends and a perimeter surface extending between the opposite ends, and each bead of the first and second plurality of beads further includes a cable passageway extending therethrough from one end thereof to the other end thereof; and the tension control cable extends through the cable passageway of the beads of the first and second plurality of beads.

4. The variable rigidity tow cable of claim 1, further comprising a sheath that surrounds the beads and the apex bead.

5. The variable rigidity tow cable of claim 1, wherein the tension control cable extends through the apex bead.

6. The variable rigidity tow cable of claim 1, the beads are positively or neutrally buoyant in water.

7. A tow vehicle that includes the variable rigidity tow cable of claim 1 mounted thereon, and the tension control device is mounted on the tow vehicle.

8. The vehicle of claim 7, wherein the apex bead that has an apex, and a centerline of the tow vehicle extends through the apex when the tension control cable is rigid.

9. A variable rigidity tow cable, comprising:
a tension control cable;
a tension control device connected to the tension control cable that controls tension in the tension control cable to increase and decrease a length of the tension control cable;
beads disposed on the tension control cable, the beads including an apex bead with first and second ends, a first plurality of the beads are slidably disposed on the tension control cable between the first end of the apex bead and a first end of the tension control cable, and a second plurality of the beads are slidably disposed on the tension control cable between the second end of the apex bead and a second end of the tension control cable;
the apex bead, the first plurality of beads and the second plurality of beads defining a rigid shape of the tension control cable upon a predetermined decrease in length of the tension control cable to a tensioned length; and the beads in the first plurality of beads and the beads in the second plurality of beads are free to move relative to one another on the tension control cable when the tension control cable has a length greater than the tensioned length;
the tension control cable comprises first and second tension control cable segments, the first plurality of the beads are disposed on the first tension control cable segment, the second plurality of the beads are disposed on the second tension control cable segment, the first tension control cable segment is fixed at one end thereof to the first end of the apex bead, and the second tension control cable segment is fixed at one end thereof to the second end of the apex bead.

10. A tow cable, comprising:
a tension control cable having a first end that is configured to connect to a tow vehicle at a first attachment point on the tow vehicle and a second end that is configured to connect to the tow vehicle at a second attachment point on the tow vehicle that is spaced from the first attachment point;
a tension control device connected to the tension control cable that controls tension in the tension control cable to increase and decrease a length of the tension control cable;
beads disposed on the tension control cable, the beads defining a rigid shape of the tension control cable upon a predetermined decrease in length of the tension control cable to a tensioned length; and the beads are free to move relative to one another on the tension control cable when the tension control cable has a length greater than the tensioned length;
a sheath that surrounds the beads and the tension control cable; and
the beads are positively or neutrally buoyant in water.

11. A tow vehicle, comprising:
a vehicle body;
a tension control cable having a first end and a second end, each of the first end and the second end are attached to the vehicle body;
a first tension control device mounted on the vehicle body and being operatively connected to the first end or to the second end of the tension control cable, the first tension control device controls tension in the tension control cable to increase and decrease a length of the tension control cable;
beads disposed on the tension control cable, the beads defining a rigid shape of the tension control cable upon a predetermined decrease in length of the tension control cable to a tensioned length by the first tension control device; and the beads are free to move relative to one another on the tension control cable when the tension control cable has a length greater than the tensioned length;
a sheath that surrounds the beads and the tension control cable; and
the beads are positively or neutrally buoyant in water.

12. The tow vehicle of claim 11, wherein the vehicle body is configured to operate in or on water.

13. The tow vehicle of claim 11, wherein the tension control cable comprises a metal cable or a chain.

14. The tow vehicle of claim 11, further comprising an apex bead disposed on the tension control cable, the apex bead includes an apex, and the apex is generally intersected by a centerline of the vehicle body when the tension control cable is at the tensioned length.

15. The tow vehicle of claim 11, wherein each of the beads has a cylindrical shape with opposite ends and a perimeter surface extending between the opposite ends, and each bead further includes a cable passageway extending therethrough from one end thereof to the other end thereof; and the tension control cable extends through the cable passageway of the beads.

16. The tow vehicle of claim 14, further comprising a sheath that surrounds the beads and the apex bead.

17. The tow vehicle of claim 14, wherein the tension control cable extends through the apex bead, a first plurality of the beads are slidably disposed on the tension control cable between a first end of the apex bead and a first end of the tension control cable, and a second plurality of the beads are slidably disposed on the tension control cable between a second end of the apex bead and a second end of the tension control cable.

18. The tow vehicle of claim 14, wherein the tension control cable comprises first and second tension control cable segments, a first plurality of the beads are disposed on the first tension control cable segment, a second plurality of the beads are disposed on the second tension control cable segment, the first tension control cable segment is fixed at one end thereof to a first end of the apex bead, and the second tension control cable segment is fixed at one end thereof to a second end of the apex bead.

19. The tow vehicle of claim 11, wherein the first tension control device is connected to the first end of the tension control cable; and further comprising a second tension control device mounted on the vehicle body and being operatively connected to the second end of the tension control cable, the second tension control device controls tension in the tension control cable to increase and decrease a length of the tension control cable.

\* \* \* \* \*